(12) United States Patent
Gutz et al.

(10) Patent No.: US 9,348,611 B2
(45) Date of Patent: *May 24, 2016

(54) NAVIGATION THROUGH HISTORICAL STORED INTERACTIONS ASSOCIATED WITH A MULTI-USER VIEW

(75) Inventors: Steve Gutz, Ontario (CA); Jason Hiltz-Laforge, Ontario (CA); Alireza Pourshahid, Ontario (CA); Graham Watts, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1200 days.

This patent is subject to a terminal disclaimer.

(21) Appl. No.: 12/938,947

(22) Filed: Nov. 3, 2010

(65) Prior Publication Data

US 2011/0107230 A1     May 5, 2011

(30) Foreign Application Priority Data

Nov. 5, 2009 (CA) .................................... 2684540

(51) Int. Cl.
*G06F 3/0481* (2013.01)
*G06F 3/0482* (2013.01)
*G06F 3/0483* (2013.01)
*G06F 9/44* (2006.01)

(52) U.S. Cl.
CPC ................................. *G06F 9/4443* (2013.01)

(58) Field of Classification Search
CPC ... G06F 3/0482; G06F 3/0481; G06F 9/4443; G06F 3/04817; G06F 8/38; G06F 1/163; G06F 3/011; H04N 5/44543

USPC ................................. 715/810, 764, 744, 755
See application file for complete search history.

(56) References Cited

U.S. PATENT DOCUMENTS

| 5,659,747 | A | 8/1997 | Nakajima |
| 5,757,372 | A | 5/1998 | Krause et al. |
| 6,185,577 | B1 | 2/2001 | Nainani et al. |
| 6,459,442 | B1 * | 10/2002 | Edwards et al. .............. 715/863 |
| 6,523,134 | B2 | 2/2003 | Korenshtein |
| 7,162,488 | B2 * | 1/2007 | DeVorchik et al. |
| 7,296,008 | B2 | 11/2007 | Passerini et al. |
| 7,657,846 | B2 * | 2/2010 | Banks et al. .................. 715/836 |

(Continued)

FOREIGN PATENT DOCUMENTS

| EP | 1141822 A1 | 10/2001 |
| JP | 2005310116 A2 | 11/2005 |

*Primary Examiner* — Amy Ng
*Assistant Examiner* — Erik Stitt
(74) *Attorney, Agent, or Firm* — James L. Baudino

(57) ABSTRACT

According to one aspect of the present disclosure an apparatus for navigation through historical stored interactions associated with a multi-user view includes a communications fabric, a memory connected to the communications fabric containing computer executable program code, and a processor unit connected to the communications fabric and executing the program code to direct the apparatus to: receive a previously saved multi-user view, wherein the multi-user view comprises a set of artifact attributes; receive an identified filter from a user; present a filtered view to the user; determine whether to amend the filtered view; responsive to a determination to amend the filtered view, generate an amended view from the filtered view; and responsive to a determination to save the amended view, save the amended view as one of a new view or an updated view.

12 Claims, 4 Drawing Sheets

(56) References Cited

U.S. PATENT DOCUMENTS

| | | | |
|---|---|---|---|
| 7,823,060 B2* | 10/2010 | Mohamed | 715/234 |
| 8,205,150 B2* | 6/2012 | Gelman et al. | 715/229 |
| 8,533,595 B2* | 9/2013 | Grossman et al. | 715/704 |
| 8,793,577 B2* | 7/2014 | Schellingerhout et al. | 715/704 |
| 2001/0049704 A1* | 12/2001 | Hamburg et al. | 707/530 |
| 2003/0065673 A1* | 4/2003 | Grobler | G06F 17/30554 |
| 2005/0183007 A1* | 8/2005 | Gaug et al. | 715/513 |
| 2006/0200466 A1* | 9/2006 | Kaasten et al. | 707/7 |
| 2006/0271383 A1* | 11/2006 | Munson | G06F 21/6218 |
| | | | 705/1.1 |
| 2007/0073695 A1* | 3/2007 | Conlan | G06F 21/6227 |
| 2007/0186157 A1* | 8/2007 | Walker et al. | 715/530 |
| 2008/0163099 A1* | 7/2008 | Gu et al. | 715/780 |

\* cited by examiner

NAVIGATION THROUGH HISTORICAL STORED INTERACTIONS ASSOCIATED WITH A MULTI-USER VIEW

BACKGROUND

The construction of a view in a software application on a data processing system by a user often involves many discrete steps. Complex views constructed by expert users can often result in a state which could take hundreds of gestures to recreate. The gestures represent various interaction including additions, deletions, and modifications required to produce the end result view.

In a business intelligence application, users can create and collaborate on a view which contains artifacts within the system, such as reports, charts and queries, as well as artifacts which are external to the system, such as web pages and really simple syndication (RSS) feeds. Different users can contribute to and modify content of the view. The users can also add metadata, such as report annotations or comments, which enable the users to further explain the content or communicate with other users The concept of an undo stack exists in software applications, so that the current user can remove, or undo, a few of the previous steps processed should the steps prove to be undesirable. Some applications will even save this undo stack after the user's session has ended enabling the user to return to the user's view to roll the view back through a sequence of a few steps. The intermediary states leading to the end result are often lost when the final view of an object is saved. Additionally, in a collaborative software application, multiple users can contribute to the same view, adding and modifying elements, metadata and other artifacts. These contributions can happen in any sequence and be spread across a number of users.

BRIEF SUMMARY

According to another embodiment, a computer program product for navigation through historical stored interactions associated with a multi-user view is presented. The computer program product comprises a computer recordable-type media containing computer executable program code stored thereon. The computer executable program code comprises computer executable program code for receiving a previously saved multi-user view, wherein the multi-user view comprises a set of artifact attributes, computer executable program code for receiving an identified filter from a user, computer executable program code for presenting a filtered view to the user, computer executable program code for determining whether to amend the filtered view, computer executable program code responsive to a determination to amend the filtered view, for generating an amended view from the filtered view, and computer executable program code responsive to a determination to save the amended view, for saving the amended view as one of a new view or an updated view.

According to another embodiment, an apparatus for navigation through historical stored interactions associated with a multi-user view is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to receive a previously saved multi-user view, wherein the multi-user view comprises a set of artifact attributes, receive an identified filter from a user, present a filtered view to the user, determine whether to amend the filtered view, responsive to a determination to amend the filtered view, generate an amended view from the filtered view, responsive to a determination to save the amended view, save the amended view as one of a new view or an updated view.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
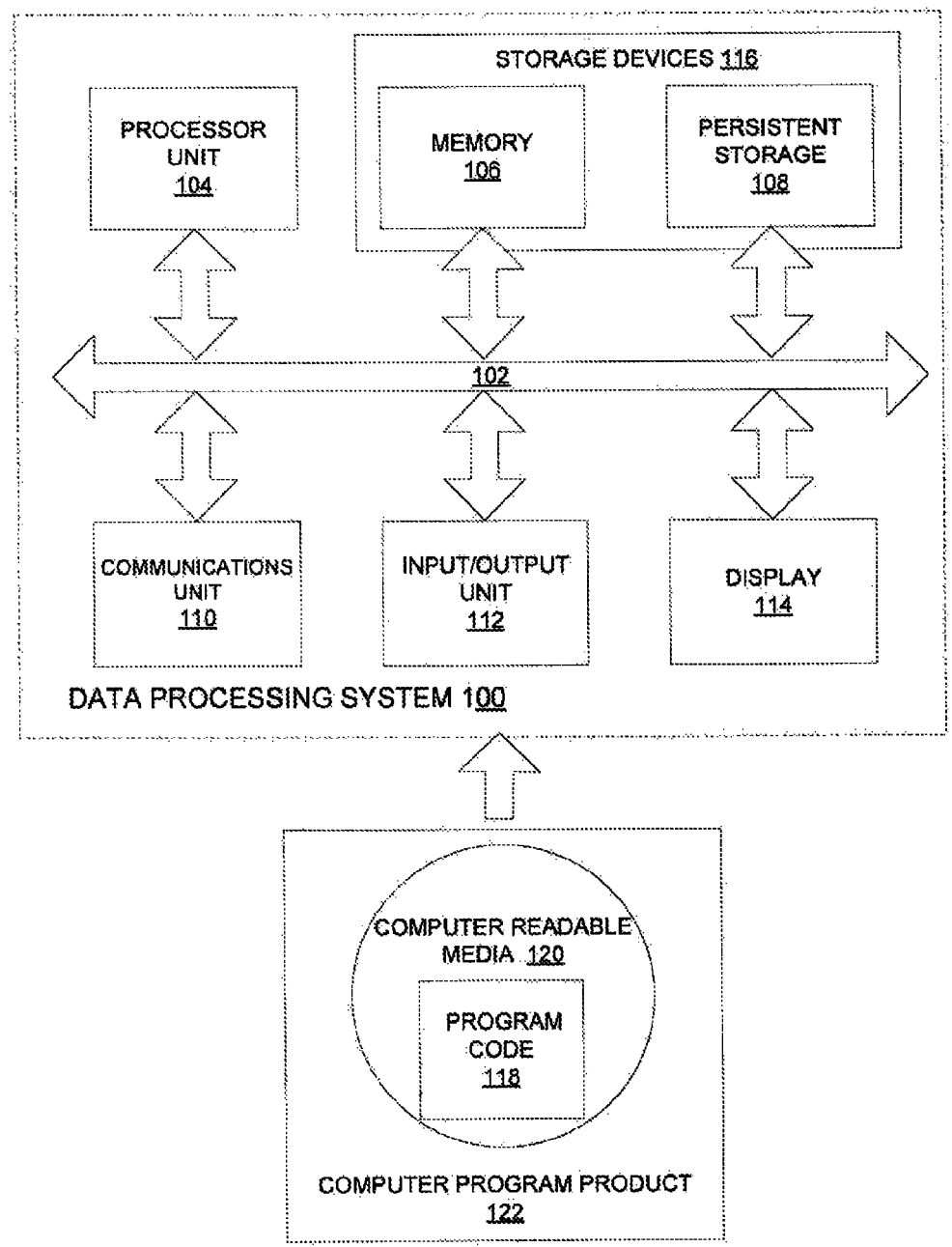
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102. Using data processing system 100 of FIG. 1 as an example, processor unit 104 receives a previously saved multi-user view through communications unit 110 or from storage devices 116. The multi-user view comprises a set of artifact attributes. Processor unit 104 further receives an identified filter from a user, through display 114 or storage devices 116 and presents a filtered view to the user using display 114. Processor unit 104 further determines whether to amend the filtered view, and responsive to a determination to amend the filtered view, generates an amended view from the filtered view, and responsive to a determination to save the amended view, saves the amended view as one of a new view or an updated view using storage devices 116.

Processor unit 104 further executes instructions stored in memory 106 or from persistent storage 108. Instructions may further be obtained through communications unit 110, or through input/output unit 112 in the form of program code 118. Processor unit 104 executes program code 118 to perform the sequence of operations just described.

In an alternative embodiment, program code 118 containing the computer-implemented method may be stored within computer readable media 120 as computer program product 122. In another illustrative embodiment, the process for navigation through historical stored interactions associated with a multi-user view may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
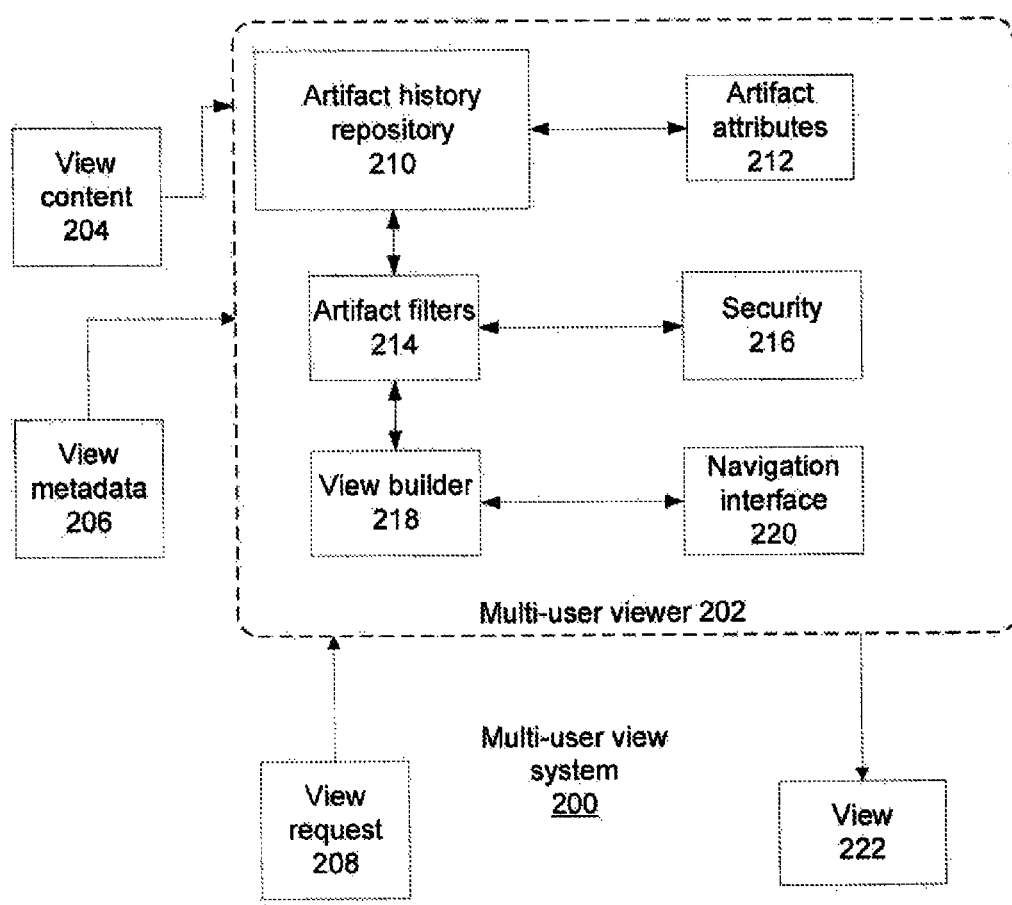
FIG. 2 is a block diagram of a multi-user view system that may be implemented within the data processing system of FIG. 1, in accordance with various embodiments of the disclosure.

With reference to FIG. 2, a block diagram of a multi-user view system that may be implemented within the data processing system of FIG. 1, in accordance with various embodiments of the disclosure is presented. Multi-user view system 200 is an example using one illustrative embodiment.

Multi-user view system 200 comprises a number of components including a multi-user viewer 202 capable of receiving view content 204, view metadata 206, view request 208 and creating view 222 as output. Multi-user viewer 202 further comprises artifact history repository 210, artifact attributes 212, artifact filters 214, security 216, view builder 218 and navigation interface 220. The components of multi-user view system 200 cooperatively process requests to present a view to a requesting user of a set of users.

Multi-user view system 200 is directed toward persisted undo stack technologies. In some embodiments, the history of a view, in the form of artifact history repository 210, is associated with the object in question. Since multiple users can contribute to the construction of the view, each artifact is stored in such a way as to identify the user associated with the artifact. Identification of the user enables a view to be filtered to only include contributions from certain users. User identification is one of the attributes of artifact attributes 212 maintained within artifact history repository 210. Artifact attributes 212 is a set of artifact attributes wherein the set comprises one or more attributes of an artifact. Attributes describe properties or behavior of an artifact.

Multi-user view system 200 provides a capability to have the history of the view saved with the view. Artifact history repository 210 provides a capability to record each intermediary step and treat the steps as a continuum rather than just an unimportant step on the way to a final product.

Artifact filters 214 are intelligently applied, because gestures applied by other users on an item that is filtered out may be invalidated. Additionally, different gestures and objects may have certain security restrictions which may mean that either the gesture cannot be viewed by the current user or cannot be filtered, or removed, as it would invalidate some gestures which are not displayed due to these restrictions.

Filter criteria of artifact filters 214 typically includes a number of filtration capabilities including filter by object, by type of object, by time of creation or change by user and by context. Associated with filtering is a determination of the effect of filtering with regard to precedence or dependence within artifacts. For example, when a filter is applied to remove all of a specific user's changes the removal of the block of updates may cause other changes due to precedence or dependence of an artifact removal. When such precedence or dependence issues arise an attempt to resolve is made or issues an error notification. For example, when block A is identified for removal during filtering, but block B has a dependency on block A the dependency needs to be resolved or an error condition is raised.

Artifact filters 214 enable filtering of the view history by context or artifact type. A view is essentially a composite of all its artifacts and gestures built up over time in a particular defined sequence. The filtering of certain artifact or gesture types must be applied intelligently as it may invalidate some of the later items in the time line. When the filtering causes invalidation that cannot be avoided the process is stopped and an error condition is raised to the requester.

The "amended view" could be an entirely new view that did not exist prior to amendment. Filtering is not limited to removing attributes from an artifact. Filtering includes applying filters in such a way that a view which has never existed in the construction history of that view can be created. For example, applying a filter to an existing view to only include changes made by a type of user may provide a new and unique perspective not previously seen. The filter can be applied as a lens to focus on particular attributes and combinations of attributes rather than a restrictive use only to eliminate attributes.

Security 216 provides a capability to determine whether a user is permitted to rollback or perform an action related to a view or event to have the view presented. Some artifacts associated with a view may therefore be locked to prevent change. In addition, some artifacts may not even be presented to some users due to security restrictions. In this case, certain artifact filters 214 may be removed from the view for that particular user.

The artifacts included in the view also occur on a certain time line. For example, one user's change may build on another user's change from a few minutes ago. Navigation interface 220 provides a capability to navigate artifact history repository 210. The capability requires artifact attributes 212 to be stored including a time aware attribute. Navigation interface 220 provides a capability to go "back in time" to a previous iteration of the view either in sequencing through iterations or directly to a point.

Navigation interface 220 also provides a capability to prompt a user for selection of a filter from a set of filters of artifact filters 214. For example, navigation interface 220 may present a slider having a range representative of a time line for a series of view gestures. A slider type control can be presented to navigate the history of the object along the time axis. A gesture to move the indicator backwards and forwards along the slider adds/removes/modifies artifacts to show the history of the view.

In another example, navigation interface 220 may present a series of lists of filter options for a user to select. In another example, navigation selection may be specified programmatically to cause a view to be built from a previously saved multi-user view.

View builder 218 provides a capability to build view 222 as a new view from a filtered view. Whether that filtering has been accomplished by going back in time, focusing on the contributions of a particular user or looking at a set of gestures or objects, the filtered results can be used as the starting point for an entirely new view. This view can, but not necessarily, replace the original view. The generated view can be viewed temporarily or viewed and saved in place as a replacement of the original view or as an additional new view.

Multi-user view system 200 therefore provides a capability to store incremental changes associated with a view to allow selective presentation and composition in the form of a re-view. In addition a modified view may be saved in place of the original view or as a completely new view. Incremental changes can be the result of a user action or be generated by the system. For example, there may be some complex user gestures which actually result in the system storing a set of incremental changes representing the different steps actually invoked. In another example, there may be an external scheduling mechanism which updates the data in the view on a regular basis, in which case the updates would need to be preserved as well.

A user presented with a multi-user view could invoke a navigational control which allows the user to filter out contributions of another specified user. The filtering process can be rather complex but also needs to be aware of the order in which the operations were performed. Multi-user view system 200 stores the artifacts as time aware, user aware and context aware, allowing dependent or sequential gestures to be performed and the filtering to evaluate the suitability of any step given that some of the previous steps may have been filtered out. A previously saved multi-user view includes views saved by the system, including intermediary steps and not just the views explicitly saved by the user.

There are a few other ways to navigate the view. One is to allow the filtering out of certain artifact types. For example, all annotations could be removed to produce an amended view. In another example, a focus on gestures and artifacts which only affect a particular set of objects may be performed. For example, a view may have only one object which is of interest to a particular user. In this example, gestures allow the other parts of the view to be filtered out and, should the user desire to do so, allow the construction of a new view to be built from that point forward.

Artifact filters 214 when applied to a view having artifact history repository 210 provides a capability to filter artifacts based on specified conditions using a set of artifact attributes as in artifact attributes 212 to create entirely new views rather than perform a rollback to a previous version. The filters provide a capability to conditionally process view content 204 and view metadata 206 to build a view rather than simply select a previously created view.

Figure 3:
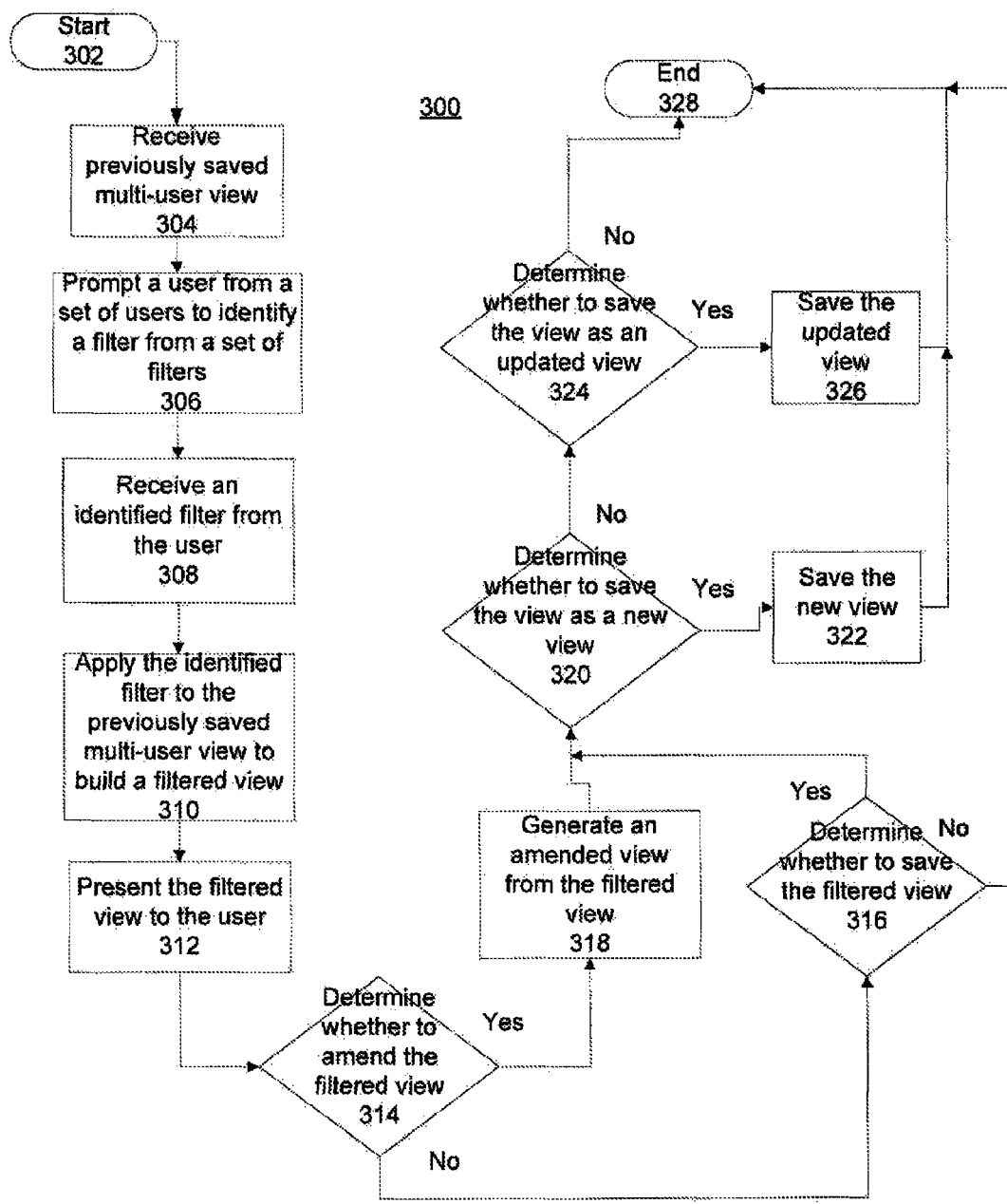
FIG. 3 is a flowchart of a view process used within the multi-user view system of FIG. 2, in accordance with various embodiments of the disclosure.

With reference to FIG. 3, a flowchart of a multi-user view process used within the multi-user view system of FIG. 2, in accordance with various embodiments of the disclosure is presented. Process 300 is an example of a view selection and navigation process as used within multi-user viewer 202 of multi-user view system 200 of FIG. 2.

Process 300 starts (block 302) and receives a previously saved multi-user view (block 304). The saved multi-user view has an associated set of artifact attributes stored in a respective artifact history repository. Process 300 prompts a user from a set of users to identify a filter from a set of filters (block 306). The filters provide a selection of conditional processing options to be applied to the stored historical information associated with the saved view.

Process 300 receives an identified filter from the user (block 308). The identified filter is applied to the previously saved multi-user view to build a filtered view (block 310). Process 300 presents the filtered view to the user (block 312).

Process 300 determines whether to amend the filtered view (block 314). For example, a filtered view may be presented and the user moves a time slider to a different point in the view history. When a determination is made to amend the filtered view, a "yes" result is obtained. When a determination is made to not amend the filtered view, a "no" result is obtained. When a "yes" is obtained in block 314, an amended view is generated from the filtered view (block 318).

When a "no" result is obtained in block 314, a determination of whether to save the filtered view is performed (block 316). When a determination is made to save the filtered view, a "yes" result is obtained in block 316. When a determination is made to not save the filtered view, a "no" result is obtained in block 316. When a "no" result is obtained in block 316, process 300 terminates (block 328).

When a "yes" result is obtained in block 316 process 300 determines whether to save the view as a new view (block 320). The determination of block 320 is also made after block 318. When a determination is made to save the view as a new view, a "yes" result is obtained in block 320. When a determination is made to not save the view as a new view, a "no" result is obtained in block 320.

When a "yes" result is obtained in block 320, process 300 saves the new view (block 322) and terminates thereafter (block 328). When a "no" result is obtained in block 320, a determination of whether to save the view as an updated view is performed (block 324). When a determination is made to save the view as an updated view, a "yes" result is obtained in block 324. When a determination is made to not save the view as an updated view, a "no" result is obtained in block 324.

When a "yes" result is obtained in block 324, process 300 saves the updated view (block 326) and terminates thereafter (block 328). When a "no" result is obtained in block 324, process 300 terminates thereafter (block 328).

Figure 4:
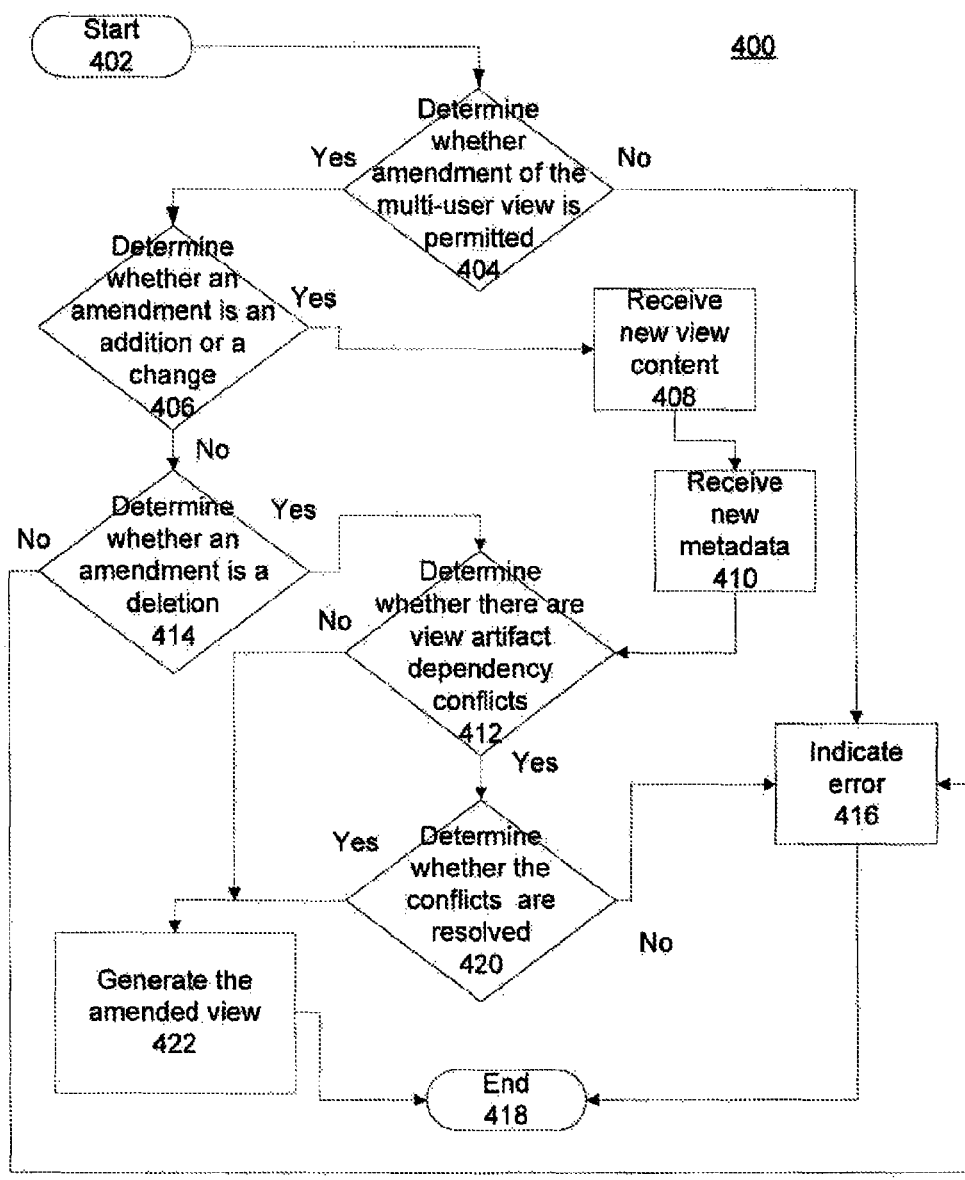
FIG. 4 is a flowchart of a view amendment process used in the view process of FIG. 3, in accordance with various embodiments of the disclosure.

With reference to FIG. 4, a flowchart of a multi-user view amendment process used in the multi-user view process of FIG. 3, in accordance with various embodiments of the disclosure is presented. Process 400 is an example of an amendment process used to generate an amended view from a filtered view as in block 318 of FIG. 3.

Process 400 starts (block 402) and determines whether amendment of a multi-user view is permitted (block 404). A multi-user view or a portion of a multi-user view may be locked to prevent unauthorized or unintended change, or a specific user or user type may not be permitted to update a view or be presented with the view. As stated previously, security 216 of FIG. 2 is used to control access to or permit update to a view.

When a determination is made that amendment of a multi-user view is permitted, a "yes" result is obtained in block 404. When a determination is made that amendment of a multi-user view is not permitted, a "no" result is obtained in block 404. When a "no" result is obtained, process 400 indicates an error (block 416) and terminates thereafter (block 418).

When a "yes" result is obtained, process 400 determines whether an amendment is an addition or a change (block 406). When a determination is made that an amendment is an addition or a change, a "yes" result is obtained. When a determination is made that an amendment is not an addition, a "no" result is obtained. When a "yes" is obtained, process 400 receives new view content (block 408). The process receives new metadata (block 410). Process 400 determines whether there are view artifact dependency conflicts (block 412). View artifact conflicts occur when additions or deletions associated with a view change the sequence of gestures or operations performed on the view content or metadata. A conflict arises when a specific sequence of operations changes. For example, a chain of events has occurred and an update is being made that alters the chain. When a new event is added or changed, a conflict may arise due to a specified sequence or a dependency associated with the impacted event. In another example, when a block of actions is deleted, other actions or blocks of actions may be dependent on the deleted block leading to a conflict. The stored artifact history repository includes time based, user based and context based information to help with conflict resolution.

Returning to block 406, when a "no" result is obtained, process 400 determines whether an amendment is a deletion (block 414). When a determination is made that an amendment is a deletion, a "yes" result is obtained. When a determination is made that an amendment is not a deletion, a "no" result is obtained. When a "no" result is obtained, process 400 indicates an error (block 416) and terminates thereafter (block 418). When a "yes" result is obtained, process 400 performs block 412 as previously stated.

When a determination is made that there are view artifact dependency conflicts, a "yes" result occurs in block 412. When a determination is made that there are no view artifact dependency conflicts, a "no" result occurs in block 412. When a "no" result is obtained in block 412, process 400 generates the amended view (block 422) and terminates thereafter (block 418). When a "yes" result is obtained in block 412, process 400 determines whether the view artifact dependency conflicts are resolved (block 420). Conflicts may be resolved through analysis of the artifact attributes and the specific artifact or operations being processed. For example, a conflict may be determined when a sequence of operations is being deleted, but dependent sequences are deleted that would otherwise cause a conflict are removed.

When a "yes" result is obtained in block 420, process 400 generates the amended view (block 422) and terminates thereafter (block 418). When a "no" result is obtained in block 420, process 400 indicates an error (block 416) and terminates thereafter (block 418).

Illustrative embodiments thus provide a computer-implemented process, a computer program product and an apparatus for navigation through historical stored interactions associated with a multi-user view that receives a previously saved multi-user view, wherein the multi-user view comprises a set of artifact attributes, receives an identified filter from a user, and presents a filtered view to the user. The process further determines whether to amend the filtered view, and responsive to a determination to amend the filtered view, generates an amended view from the filtered view, and responsive to a determination to save the amended view, saves the amended view as one of a new view or an updated view.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the flowchart illustrations might occur out of the order noted in the figures. For example, two processes shown in succession may, in fact, be executed substantially concurrently, or the processes may sometimes be executed in the reverse order, depending upon the functionality involved. It will also be noted that each process of the block diagrams and/or flowchart illustration, and combinations of processes in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product for navigation through historical stored interactions associated with a multi-user view, the computer program product comprising:
   a non-transitory computer recordable-type storage medium containing computer executable program code stored thereon, the computer executable program code including:
      computer executable program code for receiving a previously saved multi-user view, wherein the multi-user view comprises a set of artifact attributes;
      computer executable program code for receiving an identified filter from a user in response to prompting the user from a set of users to identify a filter from a set of filters, the set of filters including time based filters for filtering the view based on a time of creation or change, user based filters for filtering the view based on a user contributing to the view, object based filters for filtering the view based on one or more objects in the view, context based filters for filtering the view based on precedence or dependencies of artifacts relative to each other in the view, and type based filters for filtering the view based on a type of object;
      computer executable program code for resolving an artifact conflict based on a precedence or dependence relationship of the artifacts and the application of the filter to the multi-user view, the artifact conflict occurring when an addition or deletion associated with the application of the filter changes a sequence of operations performed on content of the multi-user view;
      computer executable program code for presenting a filtered view to the user;
      computer executable program code for determining whether to amend the filtered view;
      computer executable program code responsive to a determination to amend the filtered view, for generating an amended view from the filtered view; and
      computer executable program code responsive to a determination to save the amended view, for saving the amended view as one of a new view or an updated view.

2. The computer program product of claim 1, wherein computer executable program code for presenting a filtered view to the user further comprises computer executable program code for applying the identified filter to the previously saved multi-user view to build the filtered view.

3. The computer program product of claim 1, wherein computer executable program code for generating an amended view from the filtered view further comprises:
   computer executable program code for determining whether an amendment of the multi-user view is permitted;
   computer executable program code responsive to a determination that an amendment of the multi-user view is permitted, for determining whether the amendment is an addition or a change; and
   computer executable program code responsive to a determination that the amendment is an addition or a change, for receiving new view content and new view metadata.

4. The computer program product of claim 3, wherein computer executable program code for generating an amended view from the filtered view further comprises:

computer executable program code for determining whether the addition or change causes view artifact dependency conflicts;

computer executable program code responsive to a determination that the addition or change causes view artifact dependency conflicts, for determining whether the view artifact dependency conflicts are resolved; and computer executable program code responsive to a determination that the view artifact dependency conflicts are resolved, for generating the amended view.

5. The computer program product of claim 3, wherein computer executable program code responsive to a determination that the amendment is not an addition, for determining whether the amendment is a deletion further comprises;

computer executable program code responsive to a determination that the amendment is a deletion, for determining whether there are view artifact dependency conflicts; and computer executable program code responsive to a determination that the amendment is not a deletion, for indicating an error.

6. The computer program product of claim 1, wherein computer executable program code for saving the amended view as one of a new view or an updated view further comprises:

computer executable program code for determining whether to save the view as a new view;

computer executable program code responsive to a determination to save the view as a new view, for saving the new view;

computer executable program code responsive to as determination to not save the view as a new view, for determining whether to save the view as updated view;

computer executable program code responsive to as determination to save the view as an updated view, for saving the updated view.

7. An apparatus for navigation through historical stored interactions associated with a multi-user view, the apparatus comprising:

a communications fabric;

a memory connected to the communications fabric, wherein the memory contains computer executable program code; and a processor unit connected to the communications fabric, wherein the processor unit executes the computer executable program code to direct the apparatus to:

receive a previously saved multi-user view, wherein the multi-user view comprises a set of artifact attributes;

receive an identified filter from a user, the identified filter comprising including a context based filter for filtering the view based on dependencies of artifacts relative to each other in the view;

resolve an artifact conflict based on a precedence or dependence relationship of the artifacts and the application of the filter to the multi-user view, the artifact conflict occurring when an addition or deletion associated with the application of the filter changes a sequence of operations performed on content of the multi-user view;

present a filtered view to the user;

determine whether to amend the filtered view;

responsive to a determination to amend the filtered view, generate an amended view from the filtered view; and responsive to a determination to save the amended view, save the amended view as one of a new view or an updated view.

8. The apparatus of claim 7, wherein the processor unit executes the computer executable program code to prompt the user from a set of users to identify the filter from a set of filters, wherein the set of filters comprises a time based filter, a user based filter, an object based filter, the context based filter and a type based filter.

9. The apparatus of claim 7, wherein the processor unit executes the computer executable program code to present a filtered view to the user to further direct the apparatus to apply the identified filter to the previously saved multi-user view to build the filtered view.

10. The apparatus of claim 7, wherein the processor unit executes the computer executable program code to generate an amended view from the filtered view to further direct the apparatus to:

determine whether an amendment of the multi-user view is permitted;

responsive to a determination that an amendment of the multi-user view is permitted, determine whether the amendment is an addition or a change; and responsive to a determination that the amendment is an addition or a change, receive new view content and new view metadata.

11. The apparatus of claim 10, wherein the processor unit executes the computer executable program code to generate an amended view from the filtered view to further direct the apparatus to:

determine whether the addition or change causes view artifact dependency conflicts;

responsive to a determination that the addition or change causes view artifact dependency conflicts, determine whether the view artifact dependency conflicts are resolved; and responsive to a determination that the view artifact dependency conflicts are resolved, generate the amended view.

12. The apparatus of claim 7, wherein the processor unit executes the computer executable program code to save the amended view as one of a new view or an updated view to further direct the apparatus to:

determine whether to save the view as a new view;

responsive to a determination to save the view as a new view, save the new view;

responsive to as determination to not save the view as a new view, determine whether to save the view as updated view; and responsive to as determination to save the view as an updated view, save the updated view.

* * * * *